United States Patent [19]
Schuller et al.

[11] Patent Number: 5,921,274
[45] Date of Patent: Jul. 13, 1999

[54] INTERNAL RELIEF AND BYPASS VALVE FOR PUMPS AND PIPING SYSTEMS

[75] Inventors: Ronald A. Schuller, Tulsa; Paul J. Lutes, Oklahoma City, both of Okla.

[73] Assignee: Corken, Inc., Oklahoma City, Okla.

[21] Appl. No.: 08/661,044

[22] Filed: Jun. 10, 1996

[51] Int. Cl.⁶ .......................... F16K 17/30; F16K 15/06; F04B 49/24
[52] U.S. Cl. .................. 137/469; 137/543.23; 137/569; 417/310
[58] Field of Search .............. 137/469, 543.23, 137/569; 417/310, 307

[56] References Cited

U.S. PATENT DOCUMENTS

| | | | |
|---|---|---|---|
| 953,052 | 3/1910 | McCarty | 137/543.23 X |
| 2,287,840 | 6/1942 | Stratton | 137/469 |
| 2,375,076 | 5/1945 | Caserta | 137/569 X |
| 2,679,858 | 6/1954 | Kemp | 137/543.23 X |
| 3,021,790 | 2/1962 | Brunson | 417/310 X |
| 3,044,484 | 7/1962 | Dunning | 137/469 |
| 3,051,196 | 8/1962 | Miller | 137/543.23 X |
| 3,160,332 | 12/1964 | Brunson | 137/469 X |
| 3,183,839 | 5/1965 | Brunson et al. | 417/310 X |
| 3,199,532 | 8/1965 | Trick | 137/469 |
| 3,266,425 | 8/1966 | Brunson | 417/310 X |
| 3,266,426 | 8/1966 | Brunson | 417/310 X |
| 3,270,675 | 9/1966 | Ajam | 417/310 X |
| 3,605,793 | 9/1971 | Kinsel | 137/469 X |
| 4,498,849 | 2/1985 | Schibbye et al. | 417/310 X |
| 4,529,165 | 7/1985 | Lehrach | 137/469 X |

*Primary Examiner*—John Rivell
*Attorney, Agent, or Firm*—Hill & Simpson

[57] ABSTRACT

A pressure relief or fluid bypass valve is provided which includes a valve body comprising a first piston, a second piston and a seating land disposed between the first and second pistons. The first piston is directed toward the discharge side of the fluid system; the second piston is disposed on the suction side of the fluid system. The first piston is configured to include an entrance orifice disposed toward the discharge side of the system and at least one exit orifice disposed between the second piston and the entrance orifice. A passageway provides fluid communication between the entrance orifice and the exit orifice. When the valve is in the fully open position, fluid is communicated from the discharge side, through the entrance orifice, through the passageway and out through the exit orifice to the suction side. The valve assembly includes a spring or other biasing means for biasing the valve body into the closed or sealed position.

14 Claims, 2 Drawing Sheets

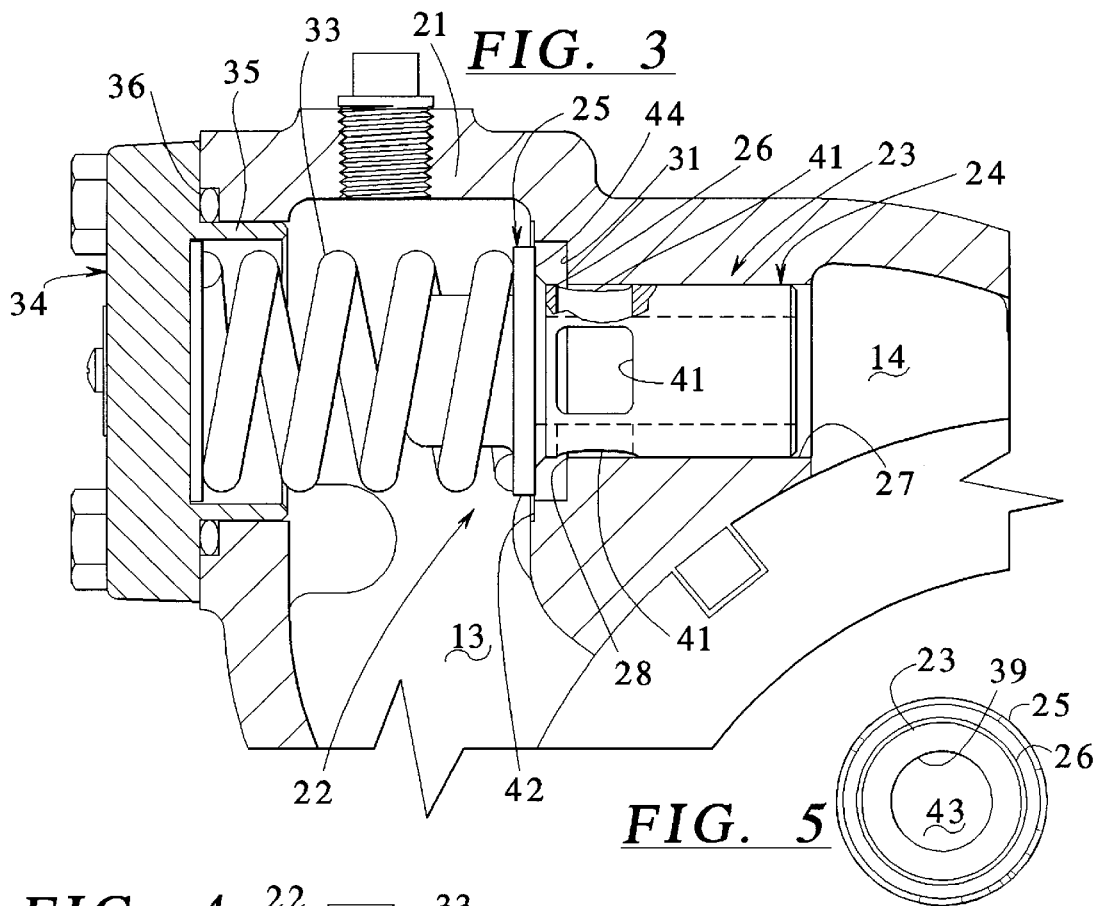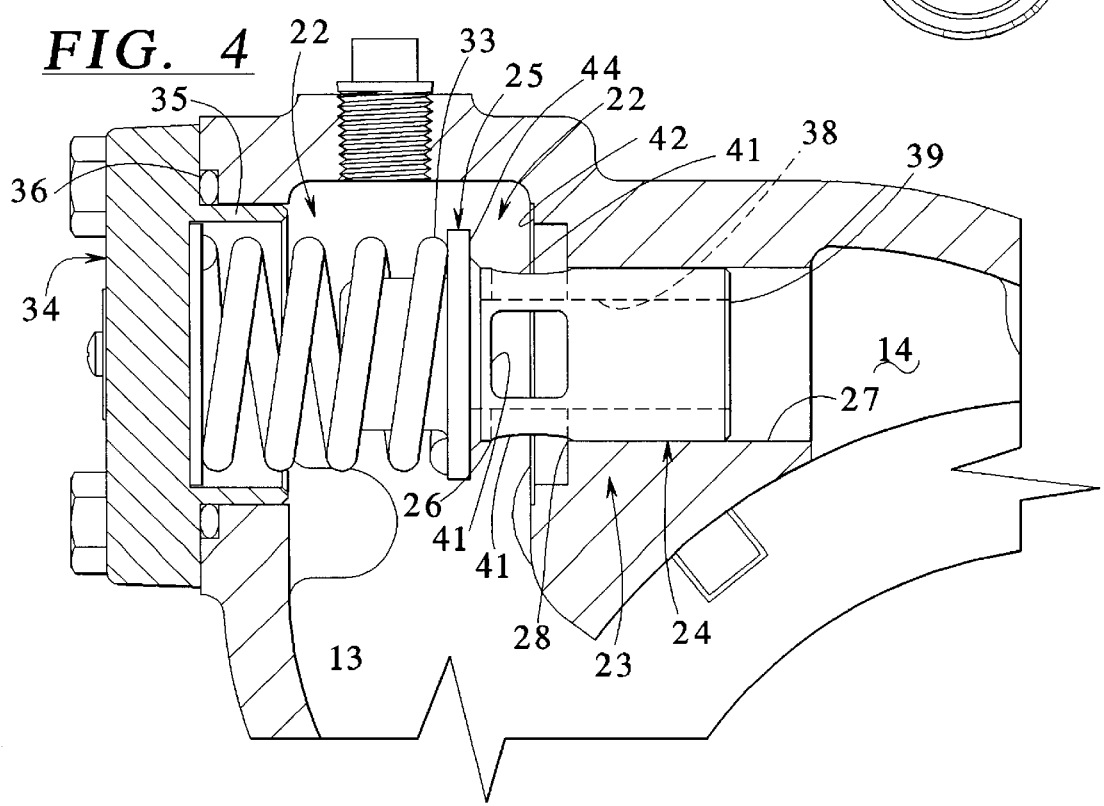

INTERNAL RELIEF AND BYPASS VALVE FOR PUMPS AND PIPING SYSTEMS

FIELD OF THE INVENTION

This invention is directed primarily to pump and piping systems. More specifically, this invention is directed to internal relief and bypass valves used to limit pressure in pump and piping systems.

BACKGROUND OF THE INVENTION

Pressure relief or bypass valves typically include an adjustable or non-adjustable spring-loaded plug which is seated on an internal orifice. The spring biases the plug into a sealed or closed position. When the pressure inside the system reaches a level sufficiently high enough to overcome the preset bias of the spring, also known as the differential pressure set point, the plug is lifted off of the orifice allowing pressurized fluid to flow past the valve and through the orifice. While this type of system is suitable for many applications, many presently available valves suffer from at least two deficiencies.

First, currently-available bypass valves tend to open and shut frequently producing a "chatter" or "water hammer" sound. This phenomena occurs when the valve is forced to cycle between the open and closed positions. Specifically, once the differential set point has been exceeded, the seal is broken and the valve opens thereby permitting flow through the valve. However, in most systems, and especially liquid systems, once a small amount of liquid is passed through the valve, the excess pressure is relieved in the system and the system pressure drops below the differential set point pressure. Consequently, the valve quickly closes. However, if the constriction or blockage that is causing the pressure increase has not been alleviated, pressure will quickly build up again to a level above the differential set point pressure and the valve will open again. Once a small amount of fluid is passed through the valve, pressure in the system is relieved and the valve closes again. Therefore, the valves are often being forced to cycle between an open and closed position which results in annoying chatter or water hammer sounds and also an undue amount of unnecessary vibration.

Second, many currently-available bypass valves may not be variable. That is, they may not permit incremental flow or small amounts of flow through the valve. Specifically, once the system pressure drops below the differential set point, currently-available valves will quickly close resulting in the chatter and water hammer sounds discussed above. These valves have only two positions—open and closed—and are unable to remain in a partially-open position for a period of time sufficient enough to permit an incremental, but substantial, amount of flow through the valve.

Accordingly, there is a need for an improved internal relief or bypass valve system for pumps and piping systems that provides full flowrate capacity relief when the differential pressure set point is exceeded and that does not chatter, vibrate or produce water hammer sounds. Further, there is a need for a relief or bypass valve that provides maximum flowrate relief as well as incremental flowrate relief. Finally, there is a need for an improved method of providing fluid bypass or pressure relief in pumps and piping systems that provides maximum capacity flowrate relief at pressures exceeding the differential pressure set point but eliminating any chatter, vibration or water hammer sounds.

SUMMARY OF THE INVENTION

The present invention provides a valve assembly and a method for providing internal pressure relief of fluid bypass in pumps and piping systems. The valve assembly includes a casing or a portion of the casing that serves as a housing for the pump or piping system. The casing comprises a discharge side cavity, a discharge side passageway, a suction side cavity and a primary counterbore disposed between the discharge side passageway and the suction side cavity. The casing also houses a valve body and a spring or other suitable biasing means. The valve body includes a first piston, a second piston and a seating land disposed between the first and second pistons. The second piston engages the spring which is accommodated between the second piston and the casing in the suction side cavity of the casing. The first piston, when the valve is in a closed position, is disposed in the discharge side passageway. The spring biases the seating land against the seat which is defined by the junction between the primary counterbore and the discharge side passageway. The spring also biases the first piston into the discharge side passageway and the second piston to a position within the primary counterbore.

The first piston includes an entrance orifice disposed at the end opposite to the second piston. The entrance orifice is in communication with a passageway which, in turn, is in communication with at least one exit orifice. The exit orifice is disposed between the entrance orifice and the second piston.

In the closed or sealed position, the spring biases the seating land against the seat. This engagement provides the primary seal. When the differential pressure set point has been exceeded, fluid under sufficient pressure has entered the entrance orifice of the first piston and has proceeded down the passageway to the exit orifice. This fluid disposed within the first piston at a pressure exceeding the differential pressure set point will cause the first piston and second pistons to move against the spring pressure and toward the suction side cavity. As this occurs, the seal is cracked and the seating land becomes disengaged from the seat and fluid passes through the exit orifice of the first piston and eventually enters the primary counterbore.

As long as the second piston is at or partially received within the primary counterbore, the annular clearance between the outside diameter (OD) of the second piston and the inside diameter (ID) of the primary counterbore will provide a limit on fluid flow past the second piston to the suction side cavity. As the valve body continues to transit toward the suction side cavity against the spring, the exit orifices of the first piston proceed into the primary counterbore and the flow capability through the first piston will exceed the flow capability around the second piston which is still partially disposed in the primary counterbore. As this condition approaches, an opening force or secondary force will be imposed on the underside of the second piston and will eventually reach a point where the valve rapidly opens and the second piston transits completely out of and way from the primary counterbore.

At that point, flow capability through the exit orifices of the first piston will become less than the flow capability around the second piston because the second piston is now disposed in the suction side cavity and substantial clearance is provided around the OD of the second piston. To the extent that flow capability through the exit orifice of the first piston approximates the pump capacity or maximum flowrate capacity, full bypass ability is achieved. During this stage, the flow energy of the fluid through the valve will be sufficient to retain the valve spring in a compressed condition. The ability of the valve to keep the spring compressed is enhanced by the underside or annular surface provided by the second piston which provides a sufficient surface area for engaging the passing fluid. The force imposed by the passing fluid on the annular underside surface of the second piston is sufficient to keep the spring compressed.

However, if the system blockage or other event which has caused the pressure build-up within the system begins to change, the flow through the valve will decrease to a point where the spring will begin to transit the valve body back to a closed position. As the second piston approaches the primary counterbore, the dynamics of the flowrate against the second piston within the primary counterbore will slow or even stop closure of the valve until such a time as sufficient primary flow through the pump system in normal operation allows the pump to operate at a pressure below the differential set point pressure. When the pump system can operate at a pressure below the differential set point pressure, the valve will reach a fully closed position.

In a preferred embodiment, a counterbore step is provided between the primary counterbore and the suction side cavity to increase the clearance between the OD second piston and the ID of the primary counterbore or casing. The increased clearance provided by the counterbore step permits an increased incremental flow around the second piston without forcing the valve to the fully open position. The force imposed by the fluid on the annular underside of the second piston is sufficient to keep the valve partially open without chatter, vibration or water hammer sounds.

In an embodiment, the present invention provides a pressure relief or bypass valve that enables incremental or less than maximum flowrate relief through the valve when a first differential set point has been reached.

In an embodiment, the present invention provides a pressure relief or bypass valve that enables the maximum flowrate capacity of the system to flow through the valve when the valve has been activated or when a second differential set point has been reached.

In an embodiment, the present invention provides an improved pump equipped with a variable pressure relief valve that is capable of permitting the maximum flowrate capacity of the pump to flow through the valve.

In an embodiment, the first piston includes a plurality of exit orifices.

In an embodiment, the first piston includes at least two exit orifices.

In an embodiment, the first piston includes at least three exit orifices.

In an embodiment, the first piston includes at least four exit orifices.

In an embodiment, the entrance orifice is disposed at a distal end of the first piston and faces the discharge side of the system.

In an embodiment, the second piston includes a spring guide member which is mateably engaged inside the end of the spring that engages the second piston.

In an embodiment, the casing includes a spring relief cap which is mateably engaged over the end of the spring that engages the casing.

In an embodiment, a counterbore step is disposed between the primary counterbore and the suction side cavity. The orifice defined by the junction between the counterbore step and the suction side cavity provides a discharge orifice which enables an amount of fluid to flow past the second piston and the counterbore step when the second piston is disposed laterally adjacent to the counterbore step after the second piston has been pushed partially out of the primary counterbore and the seating land has been disengaged from the seat.

In an embodiment, the valve assembly of the present invention permits at least 50 percent of the system maximum flowrate to flow past the valve at pressures exceeding the differential pressure set point.

In an embodiment, the valve assembly of the present invention permits at least 75 percent of the system maximum flowrate to flow past the valve at pressures exceeding the differential pressure set point.

In an embodiment, the valve assembly of the present invention permits at least 100 percent of the system maximum flowrate to flow past the valve at pressures exceeding the differential pressure set point.

It is therefore an advantage of the present invention to provide an improved pressure relief or fluid bypass valve that is capable of permitting at least 50 percent or more of the system maximum flowrate capacity to flow through the valve when activated.

Another advantage of the present invention is to provide an improved bypass and pressure relief valve which will permit the maximum flowrate of the system to flow past the valve in the event there is a complete or substantial blockage at the discharge side of the system.

Another advantage of the present invention is to provide an improved pressure relief valve which will permit varying flowrates to flow past the valve.

Another advantage of the present invention is to provide an improved bypass or pressure relief valve which will not chatter, vibrate or make water hammer noises at pressures approaching, but not exceeding the differential pressure set point.

Yet another advantage of the present invention is to provide an improved pressure relief or bypass valve with a spring that may be easily changed so that the differential pressure set point may be changed.

Still another advantage of the present invention is to provide an improved pressure relief or bypass valve which can be used in both liquid and gaseous systems.

Additional features and advantages of the present invention are described in, and will be apparent from, the detailed description of the presently preferred embodiments and from the drawings.

BRIEF DESCRIPTION OF THE DRAWINGS

For a more complete understanding of the invention, reference should be made to the accompanying drawings, wherein:

FIG. 3 is another view of the relief or bypass valve shown in FIG. 2 in a partially open position;

FIG. 4 is another view of the relief or bypass valve shown in FIG. 2 in a fully open position; and FIG. 5 is a partial end view of the valve shown in FIG. 1, particularly illustrating the fluid entrance orifice disposed in the end of the first piston.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PREFERRED EMBODIMENTS

Figure 1:
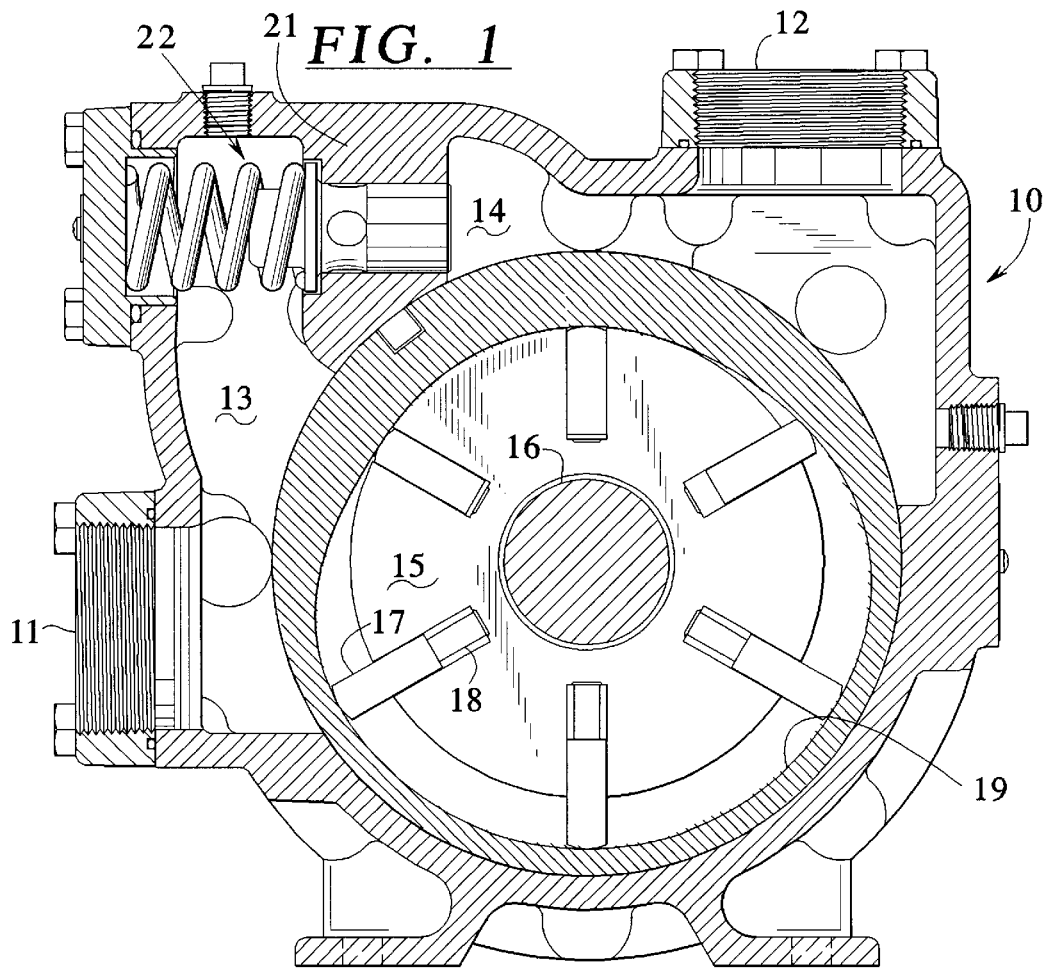
FIG. 1 is a sectional view of a pump equipped with an internal relief or bypass valve made in accordance with the present invention.

The pump apparatus 10 shown in FIG. 1 includes a suction inlet 11 and discharge outlet 12. The suction inlet 11 is in communication with a suction side cavity shown generally at 13; the discharge outlet 12 is in communication with a discharge side cavity shown generally at 14. A rotor 15 is mounted on a shaft 16 and is further equipped with a plurality of reciprocating blades shown generally at 17 that extend outward and inward on the blade drivers, shown generally at 18, so that the blades 17 may follow the eccentric path 19. The upper left portion of the casing 21 as shown in FIG. 1 accommodates a relief or bypass valve assembly 22.

Figure 2:
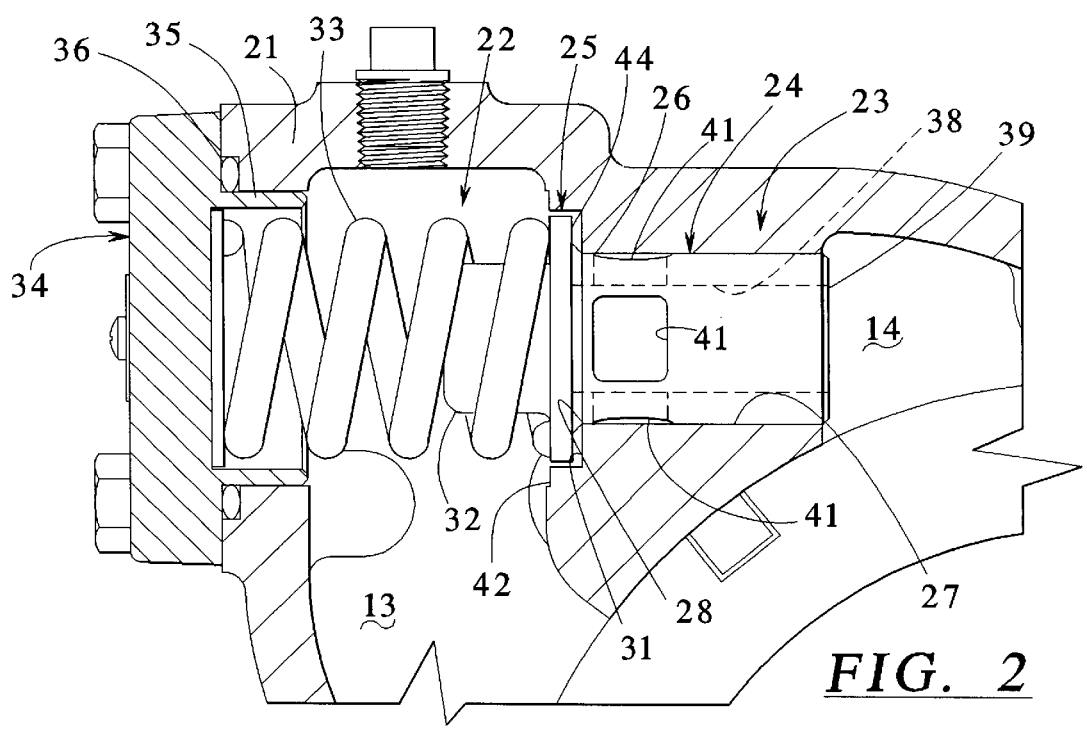
FIG. 2 is an enlarged view of the relief or bypass valve shown in FIG. 1 in a closed or sealed position.

As illustrated in FIG. 2, the assembly 22 includes a valve body 23 which includes a first piston 24, a second piston 25 and a seating land 26 disposed therebetween. The first piston 24 is accommodated in the discharge passageway 27. The seating land 26 sealably engages the seat 28 which is disposed at the junction between the primary counterbore 31 and the bore 27 of the discharge passageway 27. The seating land 26 is disposed between the first piston 24 and the second piston 25.

It will be noted that the first piston 24 is a over-square piston, meaning that the axial length of the first piston 24 is longer than the diameter of the first piston 24. In contrast, the second piston 25 is a under-square piston, meaning that the axial length of the second piston 25 is shorter than the diameter of the second piston 25.

In a preferred embodiment, the second piston 25 includes a spring guide member 32 which is mateably accommodated inside the spring 33. Also in a preferred embodiment, the casing 21 includes a spring relief valve cap 34 which includes a circumfrencial wall 35 that is mateably engaged around the spring 33. Of course, other biasing means, in addition to the spring 33, may be utilized. The O-ring 36 provides a seal between the cap 34 and casing 21. The cap 34 provides easy access to the spring 33 and the valve assembly 22 for maintenance purposes. Also, the spring 33 may be changed if a different differential pressure set point is desired.

As illustrated in both FIGS. 2 and 4, the first piston 24 includes a first piston passageway 38 which provides communication between an entrance orifice 39 and one or more exit orifices shown at 41. As shown below with respect to FIG. 4, when the valve assembly 22 is in the fully open position, the entrance orifice 39, the passageway 38 and the exit orifice(s) 41 provide communication between the discharge side cavity 14 and the suction side cavity 13. Further, the orifice 39, the passageway 38 and the one or more orifices shown at 41 may be sized so that the maximum flowrate capacity of the pump system 10 can be discharged from the discharge side cavity 14 to the suction side cavity 13 by way of the orifice 39, passageway 38 and orifice(s) 41 in the event there is a complete or near-complete blockage at the discharge end 12 (see FIG. 1) of the pump system 10.

As illustrated in FIG. 3, the valve 22 can provide partial or low flowrate relief. As the pressure in the discharge side cavity 14 exceeds the differential set point pressure, pressure within the first piston 24, and specifically against the end wall 43 (see FIG. 5), forces the valve body 23 to the left resulting in a disengagement of the seating land 26 from the seat 28. Fluid will then pass through the exit orifices 41, past the primary counterbore 31, between the second piston 25 and the counterbore step 42 and into the suction side cavity 13. The force imposed by the incremental flow on the annular underside 44 of the second piston 25 is sufficient to keep the valve 22 partially open without making chatter, vibration or water hammer sounds. The counterbore step 42 increases the clearance between the second piston 25 and the casing 21. The increased clearance between the second piston 25 and the casing 21 provided by the counterbore step 42 will permit the valve assembly 22 to permit an incremental flow from the discharge cavity 14 to the suction cavity 13.

If the pressure on the discharge side 14 reaches the differential set point, the following sequence occurs. The seal will crack and the seating land 26 becomes disengaged from the seat 28 and fluid passes through the orifice 41 into the primary counterbore 31. As long as the second piston 25 is at or partially received within the primary counterbore 31, the annular clearance between the OD of the second piston 25 and the ID of the primary counterbore 31 will provide a limit on free flow of fluid to the suction side cavity 13. As the valve body 23 continues to transit against the spring 33, eventually the flow capability through the first piston 24, and specifically through the exit orifice(s) 41 of the first piston 24, will exceed the free flow capability around the second piston 25. As this condition approaches, an opening secondary force will increase rapidly and eventually reach a point where the valve body 23 rapidly opens and a second piston 25 transits completely out of and away from the primary counterbore 31. At that point, flow capability through the exit orifice(s) 41 of the first piston 24 will become less than the flow capability around the second piston 25 because the second piston 25 is now disposed in the suction side cavity 13. To the extent that the flow capability through the first piston 24 approximates pump capacity, full bypass ability is achieved. During this stage, the flow energy of the discharge through the valve body 23 will be sufficient to retain the spring 33 in a compressed condition. However, should the downstream blockage or other event which has caused pressure build-up within the pump system begin to change, such that full diversion through the bypass valve 22 is no longer necessary, both the flow characteristics through the valve 22, and to an extent, the pressure drop across the valve 22 will begin to decline. At that point, the spring 33 will begin to transit the valve body 23 to the closed position shown in FIG. 2. As the second piston 25 again approaches the primary counterbore 31, the dynamics of rate of flow around the second piston as it becomes disposed in the primary counterbore 31 will slow or even stop the closure of the valve assembly 22 until such time as sufficient primary flow through the pump in normal operation allows pump operation at a pressure below the differential set point pressure.

Thus, an improved pressure relief and bypass valve 22 is provided which, when in the fully open position as illustrated in FIG. 4, may be sized to provide a maximum capacity flowrate from the discharge side cavity 14, through the first piston 24 and to the suction side cavity 13. Further, it is submitted that, once the differential pressure set point has been exceeded, the seating land 26 will abruptly be pushed off the seat 28 (see FIG. 2) so that the exit orifices 41 will at least partially enter into the counterbore 31 area (see FIG. 3) thereby providing at least partial communication between the discharge side cavity 14 and suction side cavity 13. If a sufficient secondary force is generated at the end wall 43 of the first piston 24 and at the underside 44 of the second piston 25, the valve assembly 22 will shortly thereafter reach the fully open position shown in FIG. 4. The sequence illustrated in FIGS. 2, 3 and 4 will happen without substantial chattering, vibrations or "water hammering" sounds. Further, incremental flow through the valve 22 while in the position shown in FIG. 3 can be provided without chatter or vibration because the fluid flowing around the second piston 25 will keep the valve 22 in a partially open position.

Valve assemblies like the one shown at 22 in the figures and other assemblies designed in accordance with the present invention also provide an improved method of providing pressure relief and fluid bypass in fluid transport systems such as the pump system 10 shown in the figures. Specifically, a valve assembly or analogous valve assembly like the one shown at 22 in the figures is provided. The seating land 26 is then biased against the seat 28 to provide a seal between the discharge side passageway 14 and the suction side passageway 13. After the system is charged to a pressure reaching the differential set point pressure as determined by the spring 33 or other similar biasing means, the seating land 26 is unseated from the seat 28 and at least a portion of the exit orifice(s) 41 is moved past the seat 28 into the counterbore 31 area to establish fluid communication between the discharge side cavity 14 and the suction side cavity 13. Fluid pressure imposed on the underside 44 of the second piston 25 and at the end wall 43 of the first piston 24 will keep the valve 22 open without chatter or vibration. If a sufficient secondary force is generated by the pressure of the fluid on the end wall 43 and annular area 44 by the combination of the flow around the second piston 25 and the pressure within the passageway 38 of the first piston 24, the spring or biasing means 33 will be collapsed further and the exit orifice(s) will be moved further to the left as shown in FIG. 4 and past the counterbore 31 area so that a maximum capacity flowrate or other desired flowrate can be obtained between the discharge side cavity 14 and the suction side cavity 13.

From the above description, it is apparent that the advantages of the present invention have been achieved. While only certain embodiments have been set forth, alternative embodiments and various modifications will be apparent to those skilled in the art. For example, instead of a maximum flowrate communication between the discharge side passageway 14 and the suction side passageway 13, a fraction, such as 50 percent, 75 percent, 95 percent, etc. of the maximum flowrate may be provided by sizing the orifice 39, passageway 38 and exit orifice(s) 41 accordingly. It will be noted that the second piston 25 and first piston 24 may be fabricated from a single piece of bar stock. Further, it will be noted that a replaceable seal seat can be used to provide the seating land 26. The spring cap 34 may also be designed so that the tension on the spring 33 may be adjusted. Further, other biasing means in addition to a spring like the spring 33 can be utilized. Of course, these and other alternatives are considered equivalents and with the spirit and scope of the present invention.

What is claimed:

1. A valve assembly for a fluid transport system, the valve assembly comprising:
   a casing comprising a discharge side and a suction side, the casing further comprising a primary counterbore disposed between the discharge side and suction side, the primary counterbore being cylindrical with an outer periphery defined by an outer wall that extends towards the suction side and terminates at a counterbore step that provides a flat annular recess that faces the suction side, the counterbore step extending radially outward from the outer wall, the casing accommodating a valve body and a spring, the suction side of the casing further comprising a fixed, stationary and non-adjustable portion for engaging the spring,
   the valve body comprising a first piston, a second piston and a seating land disposed therebetween,
   the second piston comprising a solid spring guide member that extends mateably into the spring, the spring being disposed between and engaging both a fixed, stationary and non-adjustable portion of the casing and the second piston,
   the spring biasing the seating land against a seat disposed between the suction side and the discharge side and the spring further biasing the second piston into the primary counterbore so that the second piston is mateably received in the primary counterbore with the outer wall of the primary counterbore surrounding the second piston,
   the first piston being cylindrical including an entrance orifice disposed at an end of the first piston directed toward the discharge side and a plurality of discreet exit orifice disposed between the entrance orifice and the second piston and a solid end wall disposed at the second piston, the entrance and exit orifices of the first piston being in communication with one another by way of a first piston passageway, the first piston further comprising a solid cylindrical wall between the entrance and exit orifices.

2. The valve assembly of claim 1, wherein the entrance orifice, the first piston passageway and the exit orifice permit a maximum capacity flowrate to flow therethrough.

3. The valve assembly of claim 1, wherein the first piston has a length and a diameter, the length of the first piston being greater than the diameter.

4. The valve assembly of claim 1, wherein the second piston has a length and a diameter, the length of the second piston being less than the diameter.

5. The valve assembly of claim 1, wherein the first piston includes two exit orifices.

6. The valve assembly of claim 1, wherein the first piston includes three exit orifices.

7. The valve assembly of claim 1, wherein the first piston includes four exit orifices.

8. The valve assembly of claim 1, wherein the biased engagement imposed by the spring between the seating land and the seat provides a releasable seal between the discharge and suction sides of the system.

9. The valve assembly of claim 8, wherein the second piston includes a surface area facing the discharge side, the surface area being engaged by fluid after the releasable seal is broken.

10. The valve assembly of claim 1, wherein the casing further comprises a cap for accommodating one end of the spring, the spring being disposed between the cap and the second piston.

11. The valve assembly of claim 1, wherein the casing further comprises a discharge side passageway disposed between the discharge and suction sides for slidably accommodating the first piston.

12. The valve assembly of claim 1, wherein the second piston has a larger diameter than the first piston.

13. A method for relieving pressure in from a discharge side of a fluid transport system, the fluid transport system having a maximum capacity flowrate, the method comprising the following steps:
   providing a casing including a discharge side and a suction side with a cylindrically shaped primary counterbore disposed between the suction side and the discharge side, the primary counterbore having an open first end facing the suction side and a narrower second end facing the discharge side, the narrower second end of the primary counterbore including a seat, a periphery of the primary counterbore being defined by an outer wall that extends between the open first end and the second end, the open first end of the primary counterbore further extending into a counterbore step that extends radially outward from the open first end of the primary counterbore and provides a flat annular recess that faces the suction side, the casing accommodating a valve body and a spring, the suction side of the casing further comprising a fixed, stationary and non-adjustable portion for engaging the spring, the valve body comprising a first piston, a second piston and a seating land disposed therebetween, the second piston including a solid spring guide member that mateably engages the spring, the second piston including flat annular underside facing the discharge side, the spring being disposed between and engaging both the fixed, stationary and non-adjustable portion of the casing and the second piston, the first piston being cylindrical and including an entrance orifice disposed at an end of the first piston directed toward the discharge side and a solid end wall that connects the first piston to the second piston and a plurality of discreet exit orifices disposed between the entrance orifice and the end wall, the entrance and exit orifices of the first piston being in communication with one another by way of a first piston passageway, the first piston further comprising a solid cylindrical wall between the entrance and exit orifices;

biasing the seating land against the seat disposed between the discharge side and the suction side and biasing the second piston into the primary counterbore with the spring by way of its engagement with the fixed, stationary and non-adjustable portion of the casing, charging the discharge side of the system with fluid at a pressure sufficient to transit the valve body against the spring and at least partially compress the spring against the fixed, stationary and non-adjustable part of the casing, unseating the seating land from the seat and transiting the second piston off of the second end of the primary counterbore and towards the suction side, moving at least a portion of the exit orifice past the seat, providing fluid communication from the discharge side, through the entrance orifice, through the first piston passageway, and through the exit orifice, engaging the underside of the second piston with fluid flowing through the exit orifice.

14. A fluid pump assembly comprising:

a casing, the casing including a suction side and a discharge side, the suction side of the casing comprising a fixed and non-adjustable portion for engaging a spring, the casing further comprising a primary counterbore disposed between the casing side and suction side, the primary counterbore being cylindrical with an outer periphery defined by an outer wall that extends towards the suction side and terminates at a counterbore step that provides a flat annular recess that faces the suction side, the counterbore step extending radially outward from the outer wall, the casing housing a pump mechanism providing communication from the suction side to the discharge side, the casing also comprising a relief valve assembly providing communication from the discharge side to the suction side, the relief valve assembly comprising a valve body comprising a first piston, a second piston and a seating land disposed therebetween, the second piston comprising a solid spring guide member that extends mateably into the spring, the spring being disposed between and engaging both the fixed, stationary and non-adjustable portion of the casing and the solid spring guide member of the second piston, the spring biasing the seating land against a seat disposed between the discharge and suction sides and the spring by way of its engagement with the fixed, stationary and non-adjustable portion of the casing further biasing the second piston into the primary counterbore so that the second piston is mateably received in the primary counterbore with the outer wall of the primary counterbore surrounding the second piston, the first piston being cylindrical including an entrance orifice disposed at an end of the first piston directed toward the discharge side of the system and a plurality of discreet exit orifices disposed between the entrance orifice and a solid end wall of the first piston that is connected to the second piston, the entrance and exit orifices of the first piston being in communication with one another by way of a first piston passageway, the first piston further comprising a solid cylindrical wall disposed between the entrance and exit orifices, the second piston including a flat annular surface area facing the discharge side, the surface area being engaged by fluid passing from the discharge side to the suction side.

* * * * *